US009582586B2

(12) United States Patent
Lamba (10) Patent No.: US 9,582,586 B2
(45) Date of Patent: *Feb. 28, 2017

(54) MASSIVE RULE-BASED CLASSIFICATION ENGINE

(71) Applicant: Wal-Mart Stores, Inc., Bentonville, AR (US)

(72) Inventor: Digvijay Singh Lamba, Sunnyvale, CA (US)

(73) Assignee: Wal-Mart Stores, Inc., Bentonville, AR (US)

(*) Notice: Subject to any disclaimer, the term of this patent is extended or adjusted under 35 U.S.C. 154(b) by 113 days.

This patent is subject to a terminal disclaimer.

(21) Appl. No.: 14/563,438

(22) Filed: Dec. 8, 2014

(65) Prior Publication Data

US 2015/0095275 A1    Apr. 2, 2015

Related U.S. Application Data

(63) Continuation of application No. 13/685,626, filed on Nov. 26, 2012, now Pat. No. 8,935,252.

(51) Int. Cl.
*G06F 17/30* (2006.01)
*G06N 5/04* (2006.01)

(52) U.S. Cl.
CPC .... *G06F 17/30867* (2013.01); *G06F 17/3071* (2013.01); *G06F 17/30598* (2013.01); *G06N 5/046* (2013.01)

(58) Field of Classification Search
CPC .......................... G06F 17/30; G06F 17/30589
See application file for complete search history.

(56) References Cited

U.S. PATENT DOCUMENTS

| 8,666,988 | B2* | 3/2014 | Parthasarathy | H04L 12/585 707/740 |
| 2003/0055801 | A1* | 3/2003 | Suermondt | G06K 9/6292 706/47 |
| 2006/0161423 | A1* | 7/2006 | Scott | G06F 17/2785 704/10 |
| 2007/0112701 | A1* | 5/2007 | Chellapilla | G06K 9/6256 706/15 |
| 2011/0119210 | A1* | 5/2011 | Zhang | G06N 99/005 706/12 |

* cited by examiner

*Primary Examiner* — Khanh Pham
(74) *Attorney, Agent, or Firm* — Bryan Cave LLP (57) ABSTRACT

Systems and methods are disclosed herein for performing classification of documents or performing other tasks based on rules. A rule generator receives a request for a rule that will receive as an input a document and output an outcome such as a classification of the document, addition of the document to a whitelist or blacklist, or occurrence of some other outcome. The rules are applied to a document and the document and outcome of the rules are presented to a rater. A rating of the accuracy of the outcome is received from the rater and the rating is propagated to quality metrics of rules that contributed to the outcome. Rules with a quality metric above a threshold may be added to a production rule set. Rules with a quality metric below a threshold may be removed.

20 Claims, 5 Drawing Sheets

MASSIVE RULE-BASED CLASSIFICATION ENGINE

CROSS-REFERENCE TO RELATED APPLICATIONS

This application is a continuation of U.S. application Ser. No. 13/685,626, filed Nov. 26, 2012. That application is incorporated herein by reference for all purposes.

BACKGROUND OF THE INVENTION

Many attempts have been made to automatically classify documents or otherwise identify the subject matter of a document. In particular, search engines seek to identify documents that a relevant to the terms of a search query based on determinations of the subject matter of the identified documents. Another area in which classification of documents is of importance is in the realm of social media content. Millions of users generate millions of documents in the form of social media posts every day. In order to make use of this information, the documents must often be classified or otherwise sorted. As for search engines, "spam" postings that are automatically generated or that otherwise contain irrelevant content should be removed.

Although some automatic classification methods are quite accurate they are not a substitute for human judgment. Often documents identified or classified using automated methods are completely irrelevant. In addition, these methods are subject to manipulation by "spammers" that manipulate the word usage of content to obtain a desired classification but provide no useful content.

Of course, with such a large volume of content, human classification of documents is not practical. The systems and methods described herein provide improved methods for incorporating both automated classification and human judgment.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 1:
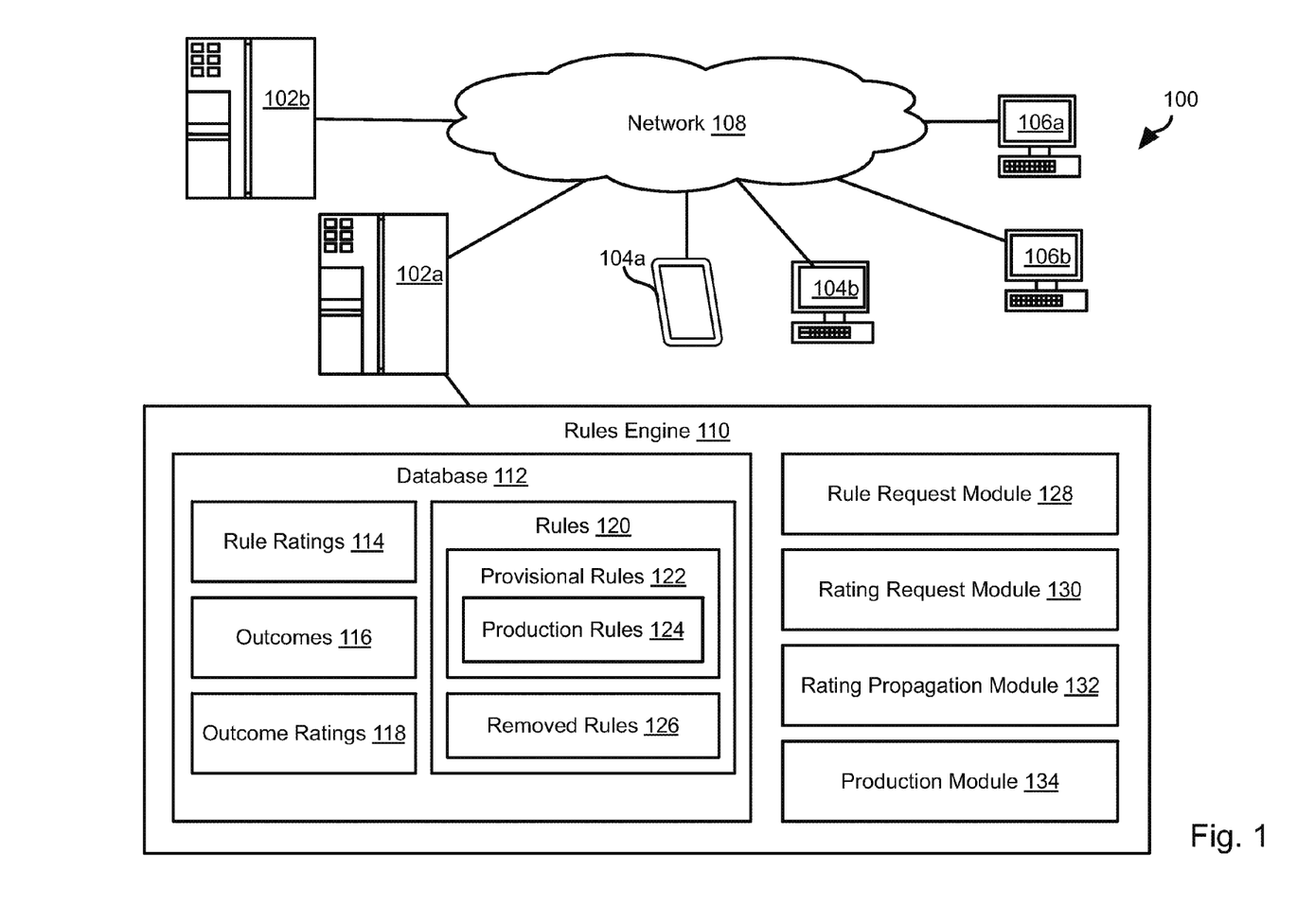
FIG. 1 is a schematic block diagram of a system for methods in accordance with embodiments of the present invention.

FIG. 1 illustrates a system 100 in which methods described hereinbelow may be implemented. The system 100 may include one or more server systems 102a, 102b that may each be embodied as one or more server computers each including one or more processors that are in data communication with one another. The server systems 102a, 102b may be in data communication with one or more user computers 104a, 104b and one or more crowdsourcing workstations 106a, 106b. In the methods disclosed herein, the user computers 104a, 104b and crowdsourcing workstations 106a, 106b may be embodied as mobile devices such as a mobile phone or tablet computer.

In some embodiments, some or all of the methods disclosed herein may be performed using a desktop computer or any other computing device as the user computers 104a, 104b or crowdsourcing workstations 106a, 106b. For purposes of this disclosure, discussion of communication with a user or entity or activity performed by the user or entity may be interpreted as communication with a computer 104a, 104b associated with the user or entity or activity taking place on a computer associated with the user or entity.

Some or all of the server 102, user devices 104a, 104b, and crowdsourcing workstations 106a, 106b may communicate with one another by means of a network 108. The network 108 may be embodied as a peer-to-peer wireless connection between devices, a connection through a local area network (LAN), WiFi network, the Internet, or any other communication medium or system.

The server system 102a may be associated with a merchant, or other entity, providing classification services of documents. For example, the server system 102a may host a search engine or a site hosted by a merchant to provide access to information about products and user opinions about products. The server system 102b may implement a social networking site that enables the generation of content by a user. For example, the server system 102b may store, provide access to, or enable generation of, social media content for a site such as Facebook™, Twitter™, FourSquare™, LinedIn™, or other social networking or blogging site that enables the posting of content by users.

A server system 102a may host a classification module 110. As already noted herein, the systems and methods described herein are particularly useful for the classification of documents. However, the systems and methods for generating and evaluating rules described herein may be used in any instance where rules are applied to data in order to achieve a desired outcome.

A server system 102a may host or otherwise interface with a rules engine 110. The rules engine 110 may include or access a database 112 for storing data, either in a transitory or non-transitory fashion, for use in accordance with the methods and modules disclosed herein. For example, the database 112 may include rule ratings 114, outcomes 116, and outcome ratings. The rule ratings 114 may include a quality metric for a rule generated and evaluated in accordance with methods disclosed herein. Outcomes 116 may include the results of application of rules to input data, such as a document input from a social media site. Outcome ratings 118 may include a rating of the accuracy, appropriateness, or other indicate of quality of an outcome of the evaluation of a document in accordance with one or more rules.

The database 112 may also include a plurality of rules 120. Rules 120 may include a provisional rule set 122 that includes a set of all rules currently being evaluated. A subset of the provisional rule set 122 may be a production rule set 124 that is used to process documents and provide outcomes in a production environment, such as the provisioning of services to the public or for processing data for internal use by an enterprise. The rules 120 may also include removed rules 126 that are rules that were generated and subsequently removed in accordance with methods described herein.

The rules engine 110 may include a rule request module 128, rating request module 130, a rating propagation module 132, and a production module 134. A rule request module 128 may formulate requests for a rule for presentation to a rule generator. A rule generator may be a human analyst. A rule request may include as little information as needed to prompt a rule generator to generate a rule or as much information as needed to provide specific guidance as to a desired outcome. For example, a rule request may identify a category or entity for which a classification rule is desired. A rule request may include background data or reference data to facilitate rule generation. For example, where a rule is desired for determining when a document should be assigned to a category or entity, a rule request may include one or more of an article from a reference corpus that described the category or entity, an entry from a dictionary defining the category or entity, one or more synonyms for textually representing the category or entity, one or more homonyms of one or more textual representations of the category or entity, one or more documents determined to be relevant to the category or entity according to an automated algorithm, or the like. In some embodiments, analysis of one or more of these reference documents may be included in a rule request. For example, the analysis may include a list of included terms, a frequency of occurrence of included terms in one or more of the reference documents, and inverse document frequency (IDF) score for an included term in some corpus, such as a reference corpus (e.g. encyclopedia or dictionary), co-occurrence statistics, commonly occurring multi-word phrases, and any other data suitable for characterizing a document and the subject matter thereof. In some embodiments, a rule request may include an automatically generated rule according to an analysis of some or all of the above described reference data. A rule generator may then modify or validate the rule as part of the rule generation process.

The rule request module 128 may then receive one or more rules from the rule generator. The rule request module 128 may translate or otherwise transform the rule from a human readable format to format suitable for automated application to a document.

A rating request module 130 may perform for a plurality of actual documents applying any applicable rules from the rules 120 to generate an outcome and then transmit each document and its corresponding outcome to a rater. A rater may be a human analyst. A rating of the accuracy or appropriateness of the outcome may then be received by the rating request module 130 from the rater for each document. A rating propagation module 132 may then propagate the rating of an outcome to all rules that contributed to the outcome. Details of how a rule may be propagated to applicable rules are included hereinbelow.

A production module 134 may receive data that is to be evaluated according to production rules 124, apply the rules to the data, and generate outcomes for use in producing outcomes of interest to actual operation of an enterprise or to members of the general public. For example, a production module 134 may process social media documents and sort them into categories and identify referenced entities. The social media documents as sorted and analyzed may then be used to, for example, provide analytic data to an enterprise or facilitate browsing of such data by a user.

Figure 2:
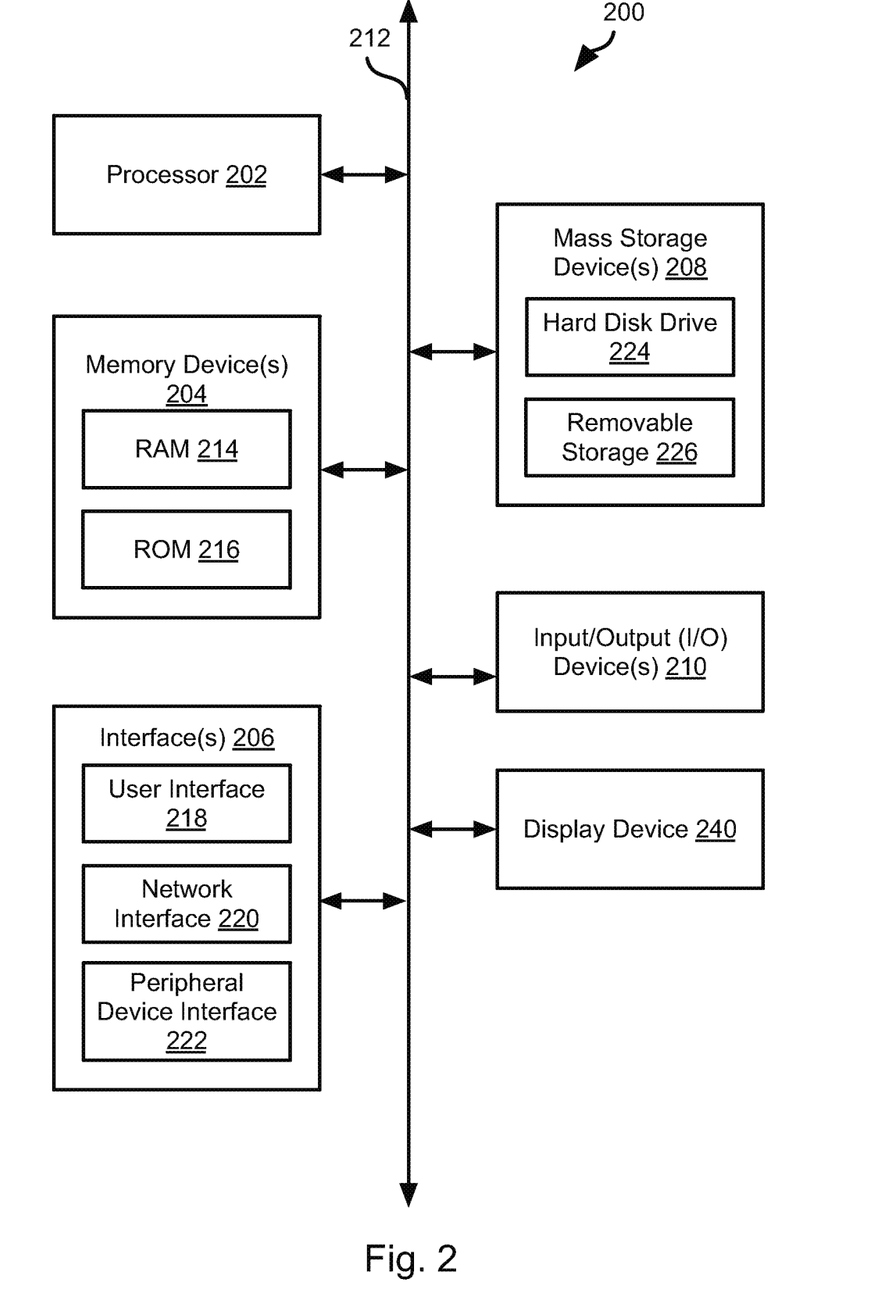
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102*a*, 102*b*, user computer 104*a*, 104*b*, and crowdsourcing workstation 106*a*, 106*b* may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device (s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
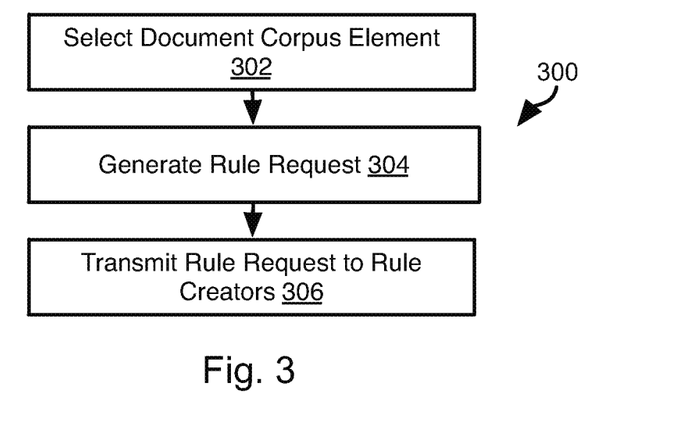
FIG. 3 is a process flow diagram of a method for requesting rules in accordance with an embodiment of the present invention.

FIG. 3 illustrates a method 300 for generating a rule request. The method 300 may include selecting 302 a document corpus element. A document corpus element may include a node of a taxonomy used to classify the document corpus such as a category or entity in the taxonomy. A document corpus element may also include a document from a document corpus, such as a stream of social media documents. For example, a document may be selected that includes a new term that has not previously been encountered or for which a definition is not found in a dictionary or index. As another example, a document that was previously incorrectly classified may be selected 302. A document that is not classified with confidence according to existing rules may also be selected 302 as the document corpus element. As will be described in greater detail below, documents may be processed according to rules to generate an outcome. The outcome and document may be presented to a rater and a rating of the outcome may be received. Where the rating indicates that the outcome is inaccurate, the document may be selected 302 as a prompt for rule generation inasmuch as a current rule set is apparently inadequate to accurately process the document.

A rule request may then be generated 304 and transmitted 306 to a rule creator, or a queue for submission to a rule creator. Generating 304 the rule request may include generating a human readable document including the selected 302 document corpus element and possibly a description of the type of rule needed. For example, where the selected document element is a node in a taxonomy, the request may indicate "generate a rule for determining whether a document belongs in this category." As described above, a rule request may also be accompanied by the above described reference data and analytic data to facilitate rule generation. Alternatively, such data may be retrieved by means of a module or interface invoked by the rule generator or on a device operated by the rule generator based on content of the rule request.

Figure 4:
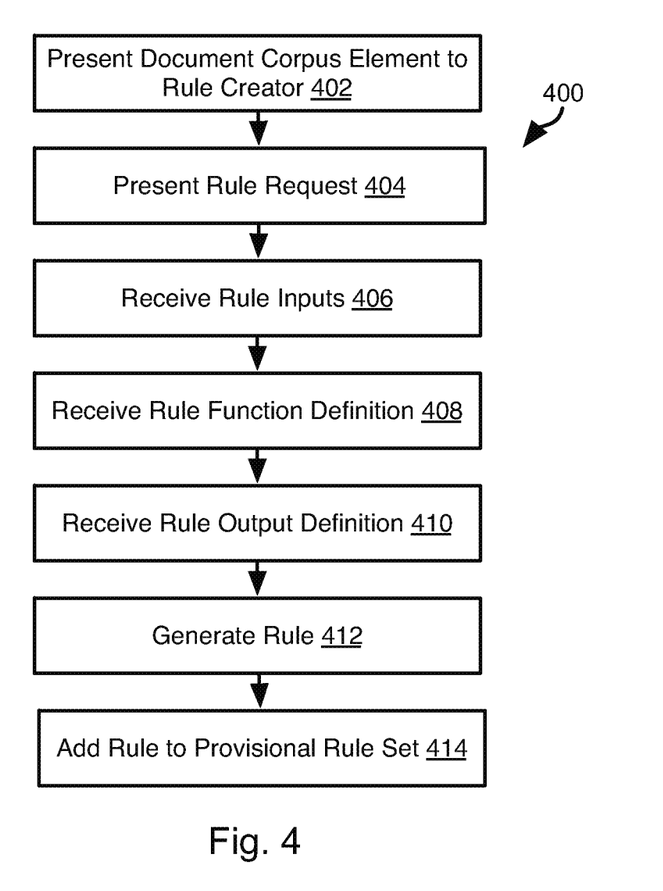
FIG. 4 is a process flow diagram of a method for generating rules in accordance with an embodiment of the present invention.

FIG. 4 illustrates a method 400 for receiving a rule from a rule generator. The method 400 may include presenting 402 the selected 302 document corpus element to the rule creator and presenting 404 the generated 304 rule request.

One or more inputs 406 to the rule may be received 406 as specified by the rule creator. Inputs 406 may include one or more of a document, a channel to which the document has previously been assigned, a category to which the document has been assigned, a taxonomy path of a document (e.g. the series nodes from the root of the taxonomy to which the document has previously been assigned), a domain from which the document was obtained, a uniform resource locator (URL), a user identifier of the user that generated the document, an influence ranking of the user, a profile of the user identifier (a summary of the topics discussed by the user in past postings and a characterization of the frequency of occurrence or significance of the topic to the user). Any other input data that can be gathered or deemed to be relevant by the rule generator.

The method 400 may further include receiving 408 a rule function definition. In some embodiments, a rule definition may be a list of words or ngrams that should be found in a document in order for a given outcome to be produced by the rule. A rule function definition may include any programmatic or logical function using the inputs, such as IF, ELSEIF, CASE, AND, NAND, OR, NOR, XOR, XNOR, and the like. A rule function definition may further include any characterization of the text of an input, including an input document. For example, a rule function may specify actions in accordance with a regular expression, a string edit distance, proximity of one string to another, co-occurrence statistics, or any other characterization of text or method for detecting the presence of a string.

The method 400 may further include receiving 410 an output definition. Where the rule request indicates a desire to determine whether a document belongs in a category or entity of a taxonomy, the output may be a Boolean value and/or an identifier of the category or entity. For example, an output may be an identifier of the category or entity and a true or false value indicating that the input document does or does not correspond to the category or entity. Alternatively, an output may include an identifier of the category or entity if the input document belongs to the category or entity and a null value or some other value if the document does not belong to the category or entity. In some embodiments, an outcome may be the assignment of a document to a whitelist of documents known to be one or more of inoffensive and relevant. An outcome may also be the assignment of a document to a blacklist of documents known to be one or both of offensive and irrelevant.

In some embodiments, documents may be assigned to category or classification class as a result of the rule. For example, a category may be associated with particular area of interest, e.g. cooking, automobiles, sports cars, a music genre, or the like. Accordingly, a received 410 rule definition may be a category to which a received document belongs.

As already noted, an input may be a category to which a document has previously been assigned. Accordingly, the output category may be used as an input to another rule along with the document that has been assigned to the category. In a like manner, where the output is category or entity, the category assigned to a document by a rule may be used as an input to another rule along with the document.

The rule inputs, rule function, and rule output may be used to generate 412 a rule. In some embodiments, a rule as input by the user may be sufficient to specify the rule. In such embodiments, generating 412 a rule be omitted. In other embodiments, a rule as specified by the rule generator may be compiled or otherwise translated in order to place the rule in condition to be automatically applied to a document. Generating 412 a rule may include generating a binary executable object that by be executed by a processor. The rule may then be added 414 to a provisional rule set. This may include one or more of adding the generated rule to a file or directory storing rules and adding reference to the rule, its inputs, and outputs to an index of available rules. In some embodiments, a rule may have a priority assigned thereto by a rule creator. Accordingly, this priority may be associated with the rule.

Figure 5:
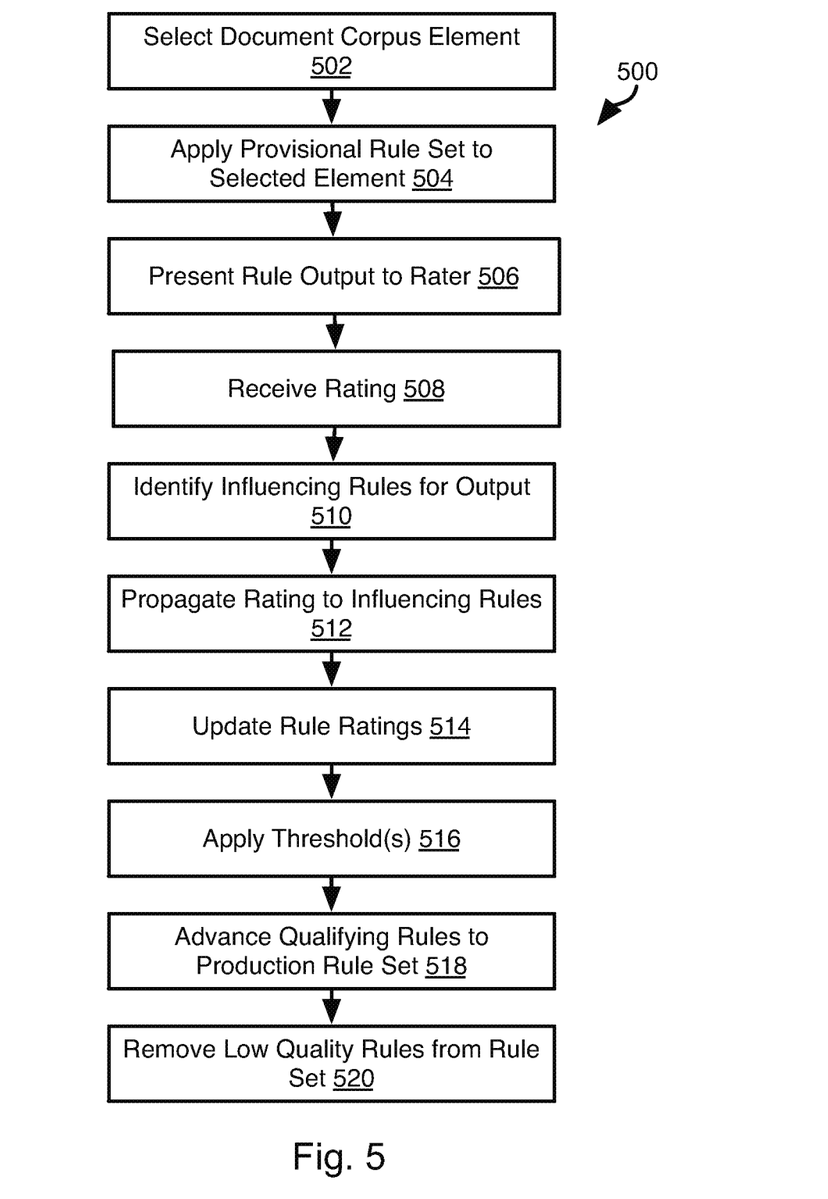
FIG. 5 is a process flow diagram of a method for rating rules in accordance with an embodiment of the present invention.

FIG. 5 illustrates a method 500 for rating rules. The rules rated may include automatically generated rules according to analysis of a document corpus, such as a taxonomy, and rules generated by a rule generated according to the method 400. The method 500 may include selecting 502 a document corpus element. For example, a selected element may include a post in a social media feed. A provisional rule set may be applied 504 to the selected 502 element. In a simple embodiment, each rule can be applied to the document element. In others, rules may be applied in accordance with a taxonomy. For example, rules corresponding to top nodes of a taxonomy may be applied, followed by rules corresponding to descendent nodes of any node to which the selected element is assigned according to the rules for the top nodes. The process may continue in this manner for descendent nodes. In embodiments where document elements are assigned to channels, a document element may be evaluated using rules for assigning documents to channels. Rules taking as inputs documents assigned to a given channel may then process the document if the document is assigned to the given channel.

An output of the application of rules may then be presented 506 to a rater. Presenting the outcome may additionally include presenting the selected element that is being rated. The output of the application rules may be a final output of rules applied serially as described above. That is to say, where one rule assigns a document to a category, a subsequent rule assigns the document to a subcategory, and so on until a rule assigns the document to a specific entity of a taxonomy, a rater may be presented only with the final assignment of the document to an entity. In other embodiments, each decision of each rule is presented to a rater. Thus assignments to categories and subcategories may be presented to a rater for review.

In either case, a rating of the result is received 508. Receiving a rating may be as simply receiving a positive or negative response, where a positive response indicates that the classification was correct. In other embodiments, the rating may be on a scale, e.g. from 1 to 5, or 1 to 10, or some other value range. With a higher value indicating greater accuracy. In some embodiments, the rule rating may include one or more of a reason why and a comment on the result from the rater. In some embodiments, a reason why may be selected from a predefined list of possible reasons.

The rules that contributed to the rated output may then be identified 510. As previously noted, a rule may assign a document to a category and a subsequent rule may receive the document and assign the document to a subcategory. Accordingly, each of these rules may be identified 510 as influencing the final result. The rating of the rater may then be propagated 512 to the identified 510 rules. In some embodiments, propagating a rating may include adjusting the score of each rule in accordance with the rating. For example, a rule may have a quality matric that is adjusted in accordance with the rating. For example, an average of ratings for the rule may be updated with each new rating to update the quality metric. In some embodiments, the amount of adjustment or weighting of rating applied to a rule's quality metric may be changed according to proximity of the rule to the final assignment of the document to a category or entity. As noted above, where rules are applied according to the hierarchy of a taxonomy, the weight of a rating may be reduced according to distance from the final assignment up the hierarchy of the taxonomy.

In some embodiments, multiple rules may have as an outcome an assignment or failure to assign a document to a category or entity. In such embodiments, the outcomes of these rules may be combined to yield a final outcome. In some embodiments, rules may have a priority associated therewith, in such embodiments, the final outcome may be a weighted average of the outputs of the multiple rules weighted according to the priority. In other embodiments, the outcome of the rule with the highest priority is taken as the final outcome and lower priority rules are ignored. For example, where a majority, or some other larger fraction, of these rules suggest assignment to a category or entity, this may be the final outcome. Where a majority, or a larger fraction, of these rules do not suggest assignment to a category or entity, this may be the final outcome. In such embodiments, propagating 512 a rating may include adjusting the quality metric of those rules that actually indicated the final assignment of the document to a category or entity that was rated by the rater. As already noted, this may include updating an average rating for the rule according to the new rating.

At some point, such as at a fixed time period, after N ratings have been received for a rule, or after each rating for a rule, the quality metric for a rule may b e compared 516 to one or more thresholds. For example, where the quality metric rises above a threshold, the rule may be advanced 518 to a production rule set. In some embodiments, a large quality metric and a sufficiently large number of ratings are required before a rule is advanced 518. In some embodiments, rules may be directly added to a production rule set.

In some embodiments, those rules that have a quality metric below a same or different threshold may be removed 520 from a rule set, such as one or both of the production rule set and provisional rule set. As for advancing a rule, a rule may be removed 520 only upon the occurrence of both a threshold number of ratings of the rule and the quality metric of the rule falling below an applicable threshold.

Figure 6:
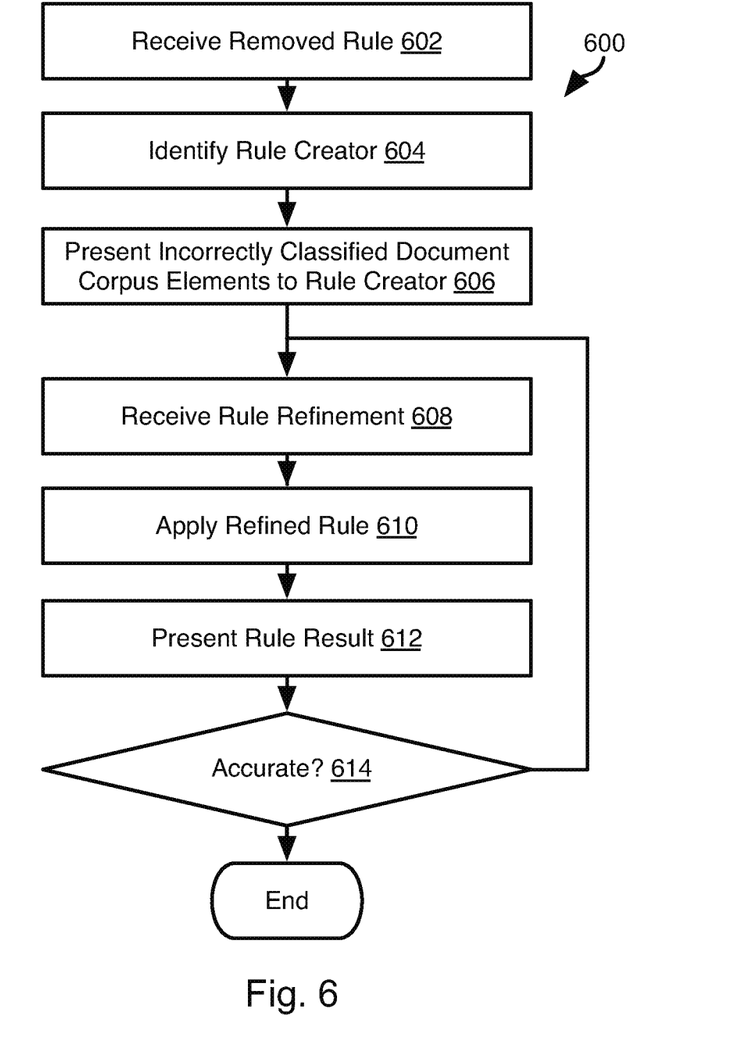
FIG. 6 is a process flow diagram of a method for reviewing removed rules in accordance with an embodiment of the present invention.

FIG. 6 illustrates a method 600 for processing removed rules. The method 600 may be invoked for some or all rules removed 520 according to the method 500. Accordingly, the method 600 may include receiving 602 notification of removal of a rule and identifying 604 the rule creator of the removed rule. In some embodiments, there may be no requirement or preference that the same analyst that generated a rule be the one to evaluate the rule upon removal. Accordingly, the step of identifying 604 the rule creator may be omitted.

The incorrectly classified document may then be presented 606 to an analyst, such as the rule creator that generated the rule. The removed rule may also be presented. In some embodiments, some or all documents incorrectly classified (e.g. with an outcome rating below a threshold) according to the removed rule may be presented 606.

A refinement 608 of the rule may be received 608. In some embodiments, the refined rule may be added to the provisional rule set and the method 600 may end. In other embodiments, one or more iterations of evaluating the refined rule and receiving further refinements may be received. Accordingly the method 600 may include one or more iterations of receiving 806 rule refinements, applying 610 to the one or more incorrectly classified documents, presenting 612 the rule result to the analyst, and receiving an indication of whether the outcome is accurate. If the result is found 614 to be accurate by the analyst, then the method 600, otherwise the method 600 may continue. In some embodiments, an analyst may conclude that the rule is simply inappropriate and end the method 600 notwithstanding a lack of an accurate result.

The systems and methods described herein advantageously provide a method for generating and evaluating rules. The methods described herein enable the creation and management of millions of rules in an automated fashion with minimal human management. In particular, by rating outcomes rather than rules, only those rules that have an effect on an outcome will be the subject of processing and those that are irrelevant are ignored.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for rule generation, the method comprising:
  receiving, by a computer system, a plurality of classification rules;
  for a set of documents in a corpus, performing, by the computer system, for each document in the set, performing repeatedly:
    applying a plurality of applicable rules from the plurality of classification rules applicable to the document by a) applying an applicable rule of the plurality of applicable rules to the document to obtain a rule outcome, b) selecting another applicable rule of the plurality of applicable rules according to the rule outcome, c) repeating a) and b) one or more times until a final rule outcome is reached;

presenting the final rule outcome and the document to a rater;
receiving a rating of the final rule outcome; and
updating, for one or more of the plurality of applicable rules, quality metrics corresponding to the one or more of the plurality of applicable rules in accordance with the rating, wherein updating, for the one or more of the plurality of applicable rules, the quality metrics comprises, for each applicable rule of the one or more of the plurality of applicable rules, adjusting the quality metric corresponding to the each applicable rule by an amount that decreases with a number of intervening rules from one of the plurality of applicable rules that produced the final rule outcome;
selecting a first portion of the plurality of applicable rules according to the quality metrics;
adding the first portion of the plurality of applicable rules to a production rule set; and
performing, by the computer system, production document classification in accordance with the production rule set.

2. The method of claim 1, wherein receiving, by the computer system, the plurality of classification rules further comprises:
selecting an element of the corpus;
transmitting a rule request with the element to a rule generator;
receiving a rule from the rule generator; and
adding the rule to the plurality of classification rules.

3. The method of claim 2, wherein the rule request includes at least one category to which the element belongs.

4. The method of claim 2, wherein the element is a web domain.

5. The method of claim 2, wherein the element is a user identifier.

6. The method of claim 2, wherein an output of the rule is a category.

7. The method of claim 2, wherein an output of the rule is a spam flag.

8. The method of claim 2, wherein an output of the rule is an entity assignment.

9. The method of claim 1, further comprising removing, by the computer system, at least one rule of the plurality of classification rules from the plurality of classification rules in accordance with a quality metric of the at least one rule.

10. The method of claim 9, further comprising:
transmitting, by the computer system, the at least one rule to one or more rule generators that generated the at least one rule; and
transmitting, by the computer system, one or more documents inaccurately classified according to the at least one rule to the one or more rule generators that generated the at least one rule.

11. A method for rule generation, the method comprising:
receiving, by a computer system, a plurality of classification rules;
for a set of documents in a corpus, performing, by the computer system, for each document in the set, performing repeatedly:
applying a plurality of applicable rules from the plurality of classification rules applicable to the document;
presenting a final rule outcome and the document to a rater;
receiving a rating of the final rule outcome; and
updating, for one or more of the plurality of applicable rules, quality metrics corresponding to the one or more of the plurality of applicable rules in accordance with the rating, wherein updating, for the one or more of the plurality of applicable rules, the quality metrics comprises, for each applicable rule of the one or more of the plurality of applicable rules, adjusting the quality metric corresponding to the each applicable rule by an amount that decreases with a number of intervening rules from one of the plurality of applicable rules that produced the final rule outcome;
selecting a first portion of the plurality of applicable rules according to the quality metrics;
adding the first portion of the plurality of applicable rules to a production rule set; and
performing, by the computer system, production document classification in accordance with the production rule set.

12. The method of claim 11, wherein receiving, by the computer system, the plurality of classification rules further comprises:
selecting an element of the corpus;
transmitting a rule request with the element to a rule generator;
receiving a rule from the rule generator; and
adding the rule to the plurality of classification rules.

13. The method of claim 12, wherein the rule request includes at least one category to which the element belongs.

14. The method of claim 12, wherein the element is a web domain.

15. The method of claim 12, wherein the element is a user identifier.

16. The method of claim 12, wherein an output of the rule is a category.

17. The method of claim 12, wherein an output of the rule is a spam flag.

18. The method of claim 12, wherein an output of the rule is an entity assignment.

19. The method of claim 11, wherein selecting the first portion of the plurality of applicable rules according to the quality metrics comprises:
comparing the quality metrics of the plurality of applicable rules to a rule threshold;
determining that the first portion of the plurality of applicable rules have quality metrics above the threshold;
determining that a second portion of the plurality of applicable rules have quality metrics below the threshold; and
discarding the second portion of the plurality of applicable rules.

20. The method of claim 19, further comprising:
transmitting, by the computer system, the second portion of the plurality of applicable rules to one or more rule generators that generated the second portion of the plurality of applicable rules; and
transmitting, by the computer system, one or more documents inaccurately classified according to the second portion of the plurality of applicable rules to the one or more rule generators that generated the second portion of the plurality of applicable rules.

* * * * *